United States Patent [19]

Hayner et al.

[11] E Re. 29,714

[45] Reissued Aug. 1, 1978

[54] FLUID FLOW RESTRICTOR

[75] Inventors: Paul F. Hayner, Gilford; Richard J. Brockway, Amherst, both of N.H.

[73] Assignee: Sanders Associates, Inc., South Nashua, N.H.

[21] Appl. No.: 665,989

[22] Filed: Mar. 11, 1976

Related U.S. Patent Documents

Reissue of:

[64] Patent No.: 3,688,800
Issued: Sep. 5, 1972
Appl. No.: 93,192
Filed: Nov. 27, 1970

[51] Int. Cl.[2] ..... F15D 1/02

[52] U.S. Cl. ..... 138/42; 137/625.28; 137/625.3

[58] Field of Search ..... 138/40, 42, 46; 137/625.28, 625.3, 625.37; 251/127; 181/264, 268

[56] References Cited

U.S. PATENT DOCUMENTS

| | | | |
|---|---|---|---|
| 973,328 | 10/1910 | Wilmann | 138/46 |
| 1,262,317 | 4/1918 | Finney et al. | 138/42 X |
| 1,612,930 | 1/1927 | Lochen | 138/38 |
| 2,069,714 | 2/1937 | Getchell | 138/42 |
| 2,126,991 | 8/1938 | Griswold | 138/42 X |
| 2,132,011 | 10/1938 | Bennett et al. | 138/40 |
| 2,210,448 | 8/1940 | Dodge | 138/42 |
| 2,567,998 | 9/1951 | Griffith | 138/42 |
| 3,513,864 | 5/1970 | Self | 138/42 X |
| 3,514,074 | 5/1970 | Self | 138/42 |
| 3,545,492 | 12/1970 | Schneid | 138/42 |
| 3,665,965 | 5/1972 | Baumann | 138/42 |

FOREIGN PATENT DOCUMENTS

| | | | |
|---|---|---|---|
| 731,246 | 2/1942 | Fed. Rep. of Germany | 138/42 |

*Primary Examiner*—Richard E. Aegerter
*Assistant Examiner*—James E. Bryant, III
*Attorney, Agent, or Firm*—Louis Etlinger; Robert K. Tendler

[57] ABSTRACT

A fluid [Flow Restrictor] *flow restrictor* especially suitable for reducing the pressure of gases or liquids is described. The restrictor comprises a series of rows of baffles placed in the path of fluid flow, with the baffles in succeeding rows staggered with respect to those in adjacent rows so that as the fluid flows, it is constrained to change its direction repeatedly. The restrictor is preferably constructed with an increasing cross sectional area along the direction of flow. One suitable physical construction comprises a plurality of thin circular plates with a central bore, arranged in a stack. Each plate has a baffle pattern formed on one or both sides, for example, by etching. Fluid flow is from the central bore, between adjacent plates, to the circumference of the stack.

12 Claims, 8 Drawing Figures

FLUID FLOW RESTRICTOR

Matter enclosed in heavy brackets [ ] appears in the original patent but forms no part of this reissue specification; matter printed in italics indicates the additions made by reissue.

FIELD OF THE INVENTION

This invention relates to fluid flow restrictors for reducing the pressure of either a liquid or a gaseous fluid.

BACKGROUND OF THE INVENTION

In the art of hydraulics, it is often necessary to reduce the pressure of a fluid, such as steam or oil, from a high value, which may exist in a source of supply, to a lower value, for use in a load device. One common type of restrictor for this purpose is simply a single sharp edged orifice. Such a restrictor reduces the pressure, but does so by generating very high fluid velocities. These high velocities in turn cause rapid erosion of the orifice edges and, what is even more important in some cases, causes intolerable high noise levels.

Another kind of restrictor comprises many long, narrow passageways such as a number of small tubes bound together or a number of long holes drilled in a block of metal. Such restrictors have been used successfully but, among other disadvantages, they are expensive to manufacture.

Another kind of restrictor is the simple tortuous path restrictor in which the fluid is forced to flow through one or more sinuous paths thereby generating friction which reduces the pressure. One disadvantage of such a restrictor is that the reduction in pressure varies greatly with the viscosity of the fluid.

Another kind of restrictor which has been known in the past is the matrix restrictor in which the fluid is passed through a porous matrix, thereby reducing pressure by friction. One difficulty with such a restrictor is that the extremely small passages required tend to become plugged due to the contamination inherent in any working fluid. If larger passages are used, the restrictor becomes very bulky.

OBJECTS OF THE INVENTION

It is a general object of the present invention to provide an improved fluid flow restrictor.

Another object of the invention is to provide a fluid flow restrictor which is very quiet in operation.

Another object of the invention is to provide a fluid flow restrictor which is easy to manufacture.

Another object of the invention is to provide a fluid flow restrictor in which the reduction in pressure does not vary greatly with the viscosity of the working fluid.

SUMMARY OF THE INVENTION

Briefly stated, in a restrictor in accordance with the invention, many rows of baffles are arranged in the path of fluid flow. The baffles in succeeding rows are staggered with respect to each other. As the fluid encounters a baffle in the first row, it is deflected to each side and flows between adjacent baffles toward the next row. The stream then encounters approximately the middle of a baffle in the second row and again is deflected to either side. Each stream so divided encounters a stream flowing in the opposite direction and the two combine and flow between adjacent baffles of the second row to the third. This process continues, and the pressure is reduced by friction with the walls and by the frequent changes in direction. The restrictor is preferably designed with an increasing flow area along the direction of flow, especially for use with compressible fluids such as gases, and such a construction is desirable even for use with incompressible fluids such as oil and water.

DETAILED DESCRIPTION OF PREFERRED EMBODIMENT

For a clearer understanding of the invention, reference may be made to the following detailed description and the accompanying drawing in which.

Figure 1:
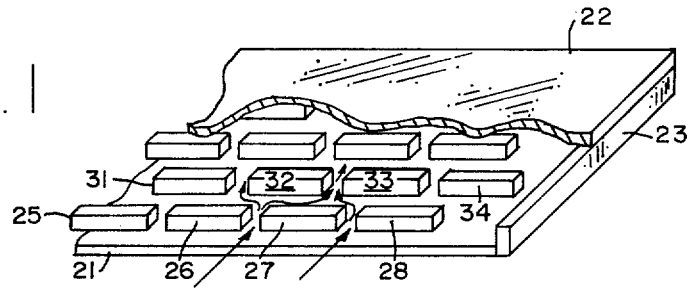
FIG. 1 is a pictorial schematic view illustrating the principles of the invention.

Referring first to FIG. 1, there is shown schematically a flow path for fluid defined by a lower plate 21, an upper plate 22, and two side plates one of which, the plate 23, is shown in FIG. 1. Fluid flows in an upward direction and to the right as viewed in FIG. 1.

A plurality of baffles are arranged in rows which are transverse to the direction of the flow path. Baffles 25, 26, 27 and 28, are arranged in the first row while baffles 31, 32, 33 and 34 are arranged in the second row. Each of the baffles is essentially a rectangular parallelepiped and has a height which extends the entire distance between the upper surface of the plate 21 and the lower surface of the plate 22. The baffles in each row are spaced apart so as to allow a passageway between adjacent baffles for the flow of fluid. Similarly, the rows of baffles are also spaced apart so as to allow room for the flow of fluid between the rows. The baffles in succeeding rows are staggered in position relative to those in the next preceding row. That is, the baffles in each row are positioned so that fluid flowing between adjacent baffles in the preceding row will strike approximately the center of the baffle and be divided into two streams each of which will flow in a direction approximately ninety degrees to its former direction and the two streams so divided will flow in opposite directions. For example, fluid entering the restrictor will flow between baffles 26 and 27 in the first row and will encounter approximately the middle of baffle 32 in the second row. There the stream will divide, part of it flowing to the left as shown in FIG. 1 and the other part flowing to the right as shown in FIG. 1 both approximately parallel to the direction of the rows. Similarly, fluid flowing between baffles 27 and 28 will be diverted or deflected by the baffle 33 and divided into two streams flowing in opposite directions. The portion of the stream flowing to the right adjacent to the baffle 32 will meet the portion of the stream flowing to the left adjacent to the baffle 33. These two streams will join and flow through the space between the baffles 32 and 33. Similar dividing and joining of streams will occur between the other baffles of the first and second rows and also will occur between the remaining rows of baffles throughout the restrictor. As the fluid flows through [its] *the* restrictor, its pressure is reduced both by friction and by the frequent changes of direction.

It is to be noted that the inlet to the restrictor, that is, the lower portion as viewed in FIG. 1, presents a plurality of flow paths to the entering fluid. These are parallel paths, not so much in the geometric sense as in the sense that a portion of the total flow passes through each simultaneously. More specifically, these paths are the passageways between adjacent baffles such as between baffles 25 and 26, between baffles 26 and 27 and between baffles 27 and 28. As the fluid flows toward the outlet (at the top as viewed in FIG. 1), it encounters additional parallel paths which are in series with the previously traversed paths. These paths include the passageways between rows as well as the passageways between adjacent baffles. This arrangement of paths, along with the division of the streams, the change of direction and the joining of streams, as described above, has been found to be very effective in reducing pressure without generating excessive noise. There is not sufficient pressure drop across any one passageway to produce noise, cavitation or erosion. The minute turbulence involved is quickly dissipated in shear losses in the fluid, that is, in heating the fluid.

Figure 2:
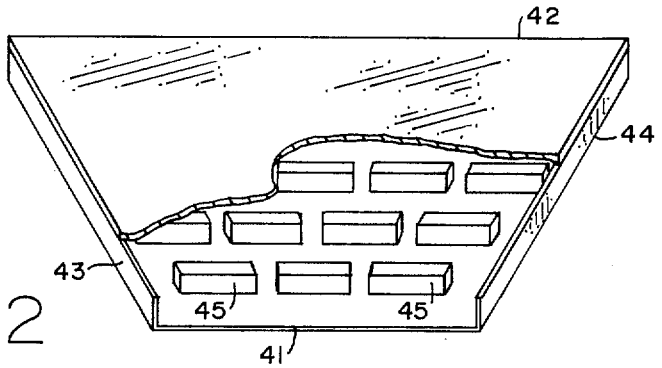
FIG. 2 is a pictorial schematic view showing a restrictor with a flow area which increases in the direction of flow.

Referring now to FIG. 2 there is shown an expanding restrictor, that is, one in which the cross sectional flow area in the direction of flow gradually increases. In other words, the total of the cross section areas of all of the streams at any given distance from the inlet to the device will be dependent upon and, in fact, will increase with, the distance from the inlet as measured along the direction of the flow of fluid. In FIG. 2, the flow path is defined by a lower plate 41, an upper plate 42, and two side plates 43 and 44. A plurality of baffles 45 are arranged in the fluid flow path in much the same way as they are in the embodiment of FIG. 1. The sides 43 and 44 diverge in the direction of flow so that there is a greater cross sectional area between the plates as the distance from the inlet increases. If the baffles are all the same size and shape and are spaced by the same amount, both laterally and in the direction of fluid flow, then the total cross sectional area available for the flow of fluid will increase as the distance from the inlet increases. This feature, an increasing flow area, is very important if the restrictor is to be used for a compressible fluid such as steam because, as the pressure decreases, the volume of such a fluid increases and there must be more volume available to accommodate it. However, this type of construction is also advantageous for use with incompressible fluids such as water and oil because, among other things, it allows a low exit velocity which is conducive to low noise operation.

Figure 3:
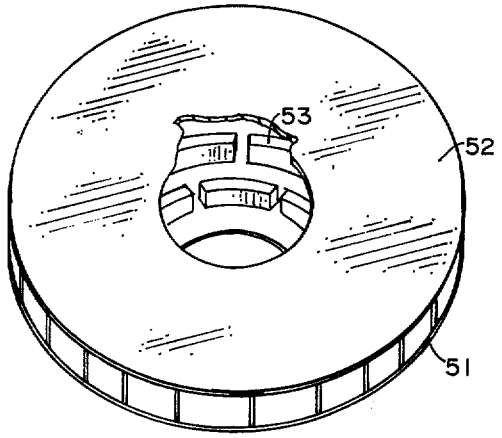
FIG. 3 is a pictorial schematic diagram illustrating a radial flow restrictor.

Referring now to FIG. 3, there is shown a radial restrictor pattern. This restrictor is made up of a lower plate 51 and an upper plate 52 each formed with a central aperture and spaced apart by a plurality of baffles 53. Fluid flows between the plates from the central aperture radially outward. Each one of the baffles may be a simple rectangular parallelepiped as in the FIG. 1 and FIG. 2 but preferably is slightly curved as shown. The various baffles are arranged in rows, as before, except that each row is circular rather than straight. The innermost row of baffles should, of course, have the greatest curvature and the curvature should decrease as the distance from the bore increases.

Figure 4:
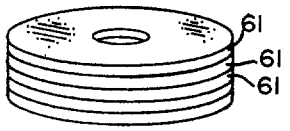
FIG. 4 is a pictorial view of a restrictor comprising a stack of plates each having a baffle pattern.
Figure 5:
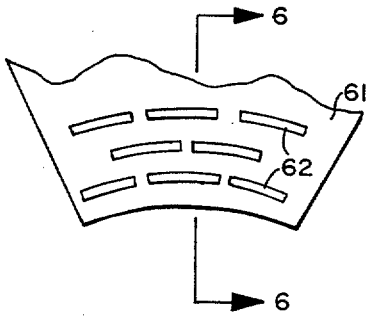
FIG. 5 is a fragmentary schematic view of one of the plates of the restrictor of FIG. 4.
Figure 6:
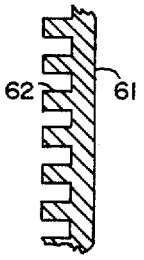
FIG. 6 is a cross sectional view taken along the lines 6—6 of FIG. 5.
Figure 7:
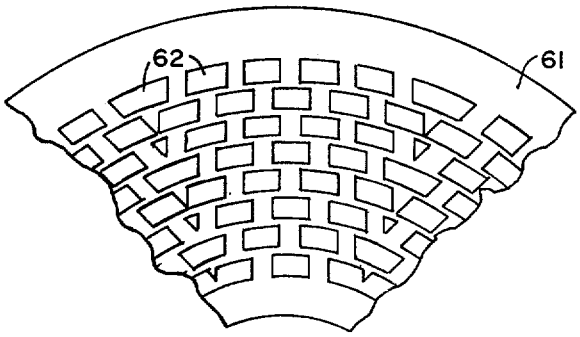
FIG. 7 is a fragmentary view of one of the plates drawn with a larger scale.

Referring now to FIGS. 4, 5, 6, and 7, there is shown a preferred form of construction for a restrictor in accordance with the present invention. As best shown in FIG. 4, the restrictor comprises a plurality of thin circular [paths] *plates*, each formed with a central circular aperture. Each plate is formed with (or has affixed thereto) a plurality of protuberances 62 constituting baffles similar to those shown in FIGS. 1, 2, and 3 and similarly positioned. The rows of baffles are circular in shape and are arranged in concentric rings. The plates are stacked, as shown in FIG. 4, and the fluid flows between the plates from the central aperture outward to the edge. It has been found convenient and economical to form the baffles by well known etching techniques. It is preferred that each plate be formed with baffles on but one side, as shown in FIG. 6. Then a plurality of identical plates can be stacked one on another with the flat side of one plate against the baffles on the other. The stack is finished with a plain flat plate covering the last baffled plate. FIG. 7 shows in more detail a sector of a plate which has been found very satisfactory.

Figure 8:
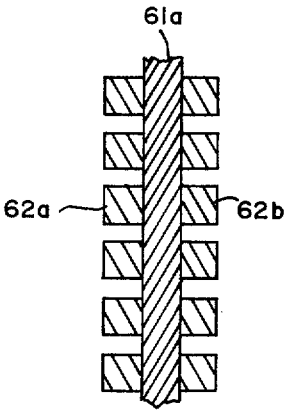
FIG. 8 is a cross sectional view of an alternative form of a plate.

Although it is preferred at present to have baffles on only one side, it is, of course, possible to form the plates with baffles on both sides as shown in FIG. 8, wherein is shown a plate 61a formed with baffles 62a on one side and baffles 62b on the other side. Then it is either necessary to be very careful of the registration of one plate upon another or alternatively it is necessary to alternate baffled plates with thin flat plates having no baffles.

In each of the illustrated embodiments of the invention, the baffles may be identical or they may be of different sizes and shapes. Similarly, the spaces between rows of baffles may be the same or may be different from row to row and likewise the spaces left between adjacent baffles may be the same throughout the restrictor or may be different in different places. The important consideration is that the size, shape and number of baffles be selected along with the spaces between adjacent baffles and the spaces between adjacent rows so that the cross sectional flow area does not decrease substantially in the direction of flow. Indeed, it is preferred at present that this cross sectional area increase as the distance from the inlet increases. When the restrictor is used with a gaseous fluid, such construction allows the fluid to expand as its pressure is reduced. When used with an incompressible fluid such as water or oil, the increasing area allows the velocity of the fluid to decrease thereby reducing the noise emitted.

Restrictors in accordance with the present invention are useful in both piston and rolling ball type servo valves where it is desired to incorporate a restrictor into one or more of the ports. Such restrictors are also useful in ordinary pressure reducing valves. In both cases the construction shown in FIGS. 4–7 is preferred at present. In the case of the valve, a plug of one kind or another can be moved axially along the bore so as to vary the number of passageways open to the flow of fluid and thereby vary the pressure reduction. However, the restrictor is not limited to such uses and may be used wherever it is desirable to decrease the pressure of a flowing fluid.

Although some preferred embodiments of the invention have been described in considerable detail for illustrative purposes, many modifications will occur to those skilled in the art. It is therefore desired that the protection afforded by Letters Patent be limited only by the true scope of the appended claims.

[I] *We* claim:

1. A *low noise level* restrictor *having an inlet* for insertion in a fluid path for controlling the flow of fluid therethrough, comprising, a plurality of spaced apart parallel impervious plates, means for constraining fluid to flow between adjacent plates, *and* a plurality of unconnected baffles between said plates, *each* in engagement with *both* facing surfaces of adjacent plates and arranged in rows transverse to the general direction of fluid flow, undeviating spaces between adjacent rows and spaces between adjacent baffles in each row as to define transverse passageways between rows and substantially straight longitudinal passageways between adjacent baffles in each row interconnecting adjacent transverse passageways, the baffles in succeeding rows being positioned so as to divide the flow arriving from the spaces between adjacent baffles of the preceding row[.],

*said restrictor having a first row of baffles at said inlet defining a first longitudinal set of passageways having a first total cross-sectional flow area and each succeeding row of longitudinal passageways having a total cross-sectional flow area greater than the cross-sectional flow area of the preceding row, such that the total cross-sectional flow area of said longitudinal passageways between said baffles at any given distance from said inlet increases with the distance from the inlet as measured along the direction of flow of fluid so as to reduce the noise level caused by the insertion of said restrictor into said fluid path.*

[2. A restrictor in accordance with claim 1 in which the sizes, shapes and numbers of said baffles are selected and said baffles are positioned so that the cross sectional flow area does not decrease in the direction of flow.]

[3. A restrictor in accordance with claim 1 in which the sizes, shapes and numbers of said baffles are selected and said baffles are positioned so that the cross sectional flow area remains substantially constant along the direction of flow.]

[4. A restrictor in accordance with claim 1 in which the sizes, shapes and numbers of said baffles are selected and said baffles are positioned so that the cross sectional flow area increases in the direction of flow.]

5. A restrictor in accordance with claim 1 in which said baffles are positioned so that a stream of fluid passing between adjacent baffles of one row encounters a baffle in a succeeding row and is thereby constrained to change its direction of flow.

6. A restrictor in accordance with claim 1 in which said baffles are positioned to define a plurality of series and parallel flow paths.

7. A restrictor in accordance with claim 1 in which said baffles are positioned so that a stream of fluid encountering a baffle is divided into two streams which then flow in opposite directions, each at approximately ninety degrees to its former direction.

8. A restrictor in accordance with claim 1 in which said baffles are positioned so as to divide a fluid stream striking it into two streams flowing in opposite directions approximately parallel to said rows.

9. A restrictor in accordance with claim 8 in which said baffles are positioned so that said streams flowing parallel to said rows encounter and join oppositely flowing streams in turning and flowing between baffles of the next succeeding row.

10. A *low noise level* restrictor for insertion in a fluid flow path for controlling the flow of fluid therethrough, comprising, a plurality of thin plates [assembled into a stack], each of said plates being formed with a central aperture,

*said plates being assembled into a stack with said apertures aligned and constituting a fluid inlet,* each of said plates also being formed with a plurality of unconnected baffles on at least one side thereof, said baffles being arranged in concentric rows about said central aperture with uniform annular spaces between rows and radial spaces between adjacent baffles in each row as to define circular passageways between rows and substantially straight radial passageways between adjacent baffles in each row interconnecting adjacent circular passageways, whereby *fluid entering said fluid inlet flows between adjacent plates and encounters* said baffles *which* divide the flow and define a plurality of paths along the surfaces of said plates between baffles interconnecting said central aperture with the outside edge[.],

*said restrictor having a first row of baffles at said inlet defining a first radial set of passageways having a first total cross-sectional flow area and each succeeding row of radial passageways having a total cross-sectional flow area greater than the total cross-sectional flow area of the preceding row, such that the total cross-sectional flow area of said radial passageways between said baffles at any given distance from the inlet increases with distance from the inlet as measured along the direction of the flow of fluid so as to reduce the noise level caused by the insertion of said restrictor into said fluid flow path.*

11. A restrictor in accordance with claim 10 in which said plates are formed with baffles on but one side thereof and in which said stack includes one plate without baffles.

12. A restrictor in accordance with claim 10 in which said plates are formed with baffles on both sides and said stack includes a plurality of plates without baffles alternating with said plates with baffles.

13. A restrictor in accordance with claim 10 in which said baffles are positioned to define a plurality of series and parallel paths between said central aperture and said outside edge.

14. A restrictor in accordance with claim 10 in which said plates and said aperture are circular and in which said baffles are positioned so that fluid flowing between adjacent baffles in a row strikes and is deflected by a baffle in the next succeeding row.

[15. A restrictor in accordance with claim 14 in which the sizes, shapes and numbers of said baffles are selected and said baffles are positioned so that the cross sectional flow area increases with radial distance from the center of said plates.]

16. A *low noise* restrictor for insertion in a fluid flow path for reducing the pressure of a fluid flowing therethrough, comprising, a plurality of thin, circular plates, each formed with a circular, central aperture,

*said plates being assembled into a stack with said apertures aligned and constituting a fluid inlet,* each of said plates being smooth on one side and formed with a plurality of unconnected baffles on the other side so arranged in concentric circular rings with a continuous annular space between adjacent rings and radial spaces [and] between adjacent baffles in each ring for the flow of fluid as to define concentric circular passageways between rows and substantially straight radial passageways between adjacent baffles in each row connecting adjacent circular passageways, the baffles in each ring being positioned so that fluid *entering said inlet and* flowing radially outwardly between adjacent baffles strikes a baffle in the next succeeding ring and is divided thereby[.],

*said restrictor having a first row of baffles at said inlet defining a first radial set of passageways having a first*

*total cross-sectional flow area and each succeeding row of radial passageways having a total cross-sectional flow area greater than the total cross-sectional flow area of the preceding row, such that the total cross-sectional flow area of said radial passageways between said baffles at any given distance from said inlet increases with the distance from the inlet as measured along the direction of flow of fluid, so as to reduce the noise level caused by the insertion of said restrictor into said fluid flow path.*

[17. A restrictor in accordance with claim 16 in which the sizes, shapes and number of said baffles are selected and said baffles are positioned so that the cross sectional flow area increases with the radial distance from the center of said stack.]

* * * * *